(12) United States Patent
Dirito

(10) Patent No.: US 6,708,441 B2
(45) Date of Patent: *Mar. 23, 2004

(54) FISH BITE DETECTOR

(76) Inventor: Anthony Richard Dirito, 1604 Sherman St., Alameda, CA (US) 94501

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/638,833

(22) Filed: Apr. 29, 1996

(65) Prior Publication Data

US 2003/0089020 A1 May 15, 2003

(51) Int. Cl.⁷ .............................................. A01K 97/12
(52) U.S. Cl. ............................................. 43/17; 43/25
(58) Field of Search .................... 43/17, 25; 340/573

(56) References Cited

U.S. PATENT DOCUMENTS

| | | |
|---|---|---|
| 3,559,327 A | 2/1971 | Christopher |
| 3,868,668 A * | 2/1975 | Woodbury ............... 43/17 |
| 4,422,258 A | 12/1983 | Adams et al. |
| 4,586,284 A | 5/1986 | Westwood, III |
| 4,731,946 A | 3/1988 | Blythe et al. |
| 5,010,678 A | 4/1991 | Peck et al. |
| 5,088,223 A | 2/1992 | Chu |
| 5,097,618 A * | 3/1992 | Stoffel ..................... 43/17 |
| 5,248,113 A | 9/1993 | Daniels |
| 5,261,180 A | 11/1993 | Foster et al. |
| 5,274,943 A | 1/1994 | Ratcliffe et al. |
| 5,293,710 A | 3/1994 | Mills |
| 5,321,391 A * | 6/1994 | Fox .......................... 43/17 |
| 5,321,903 A | 6/1994 | Ebener |
| 5,341,589 A | 8/1994 | Gutierrez |
| 5,396,726 A | 3/1995 | Zepeda, Sr. |
| 5,450,687 A | 9/1995 | Fox |
| 5,532,681 A * | 7/1996 | Peters ................. 340/573 |
| 5,771,624 A * | 6/1998 | Vickery .................. 43/17 |
| 5,782,033 A * | 7/1998 | Park ....................... 43/17 |
| 5,867,931 A * | 2/1999 | Morris .................... 43/17 |

FOREIGN PATENT DOCUMENTS

| | | | | |
|---|---|---|---|---|
| CH | 565504 | * | 8/1975 | .......... 43/17 |
| DE | 2627638 | * | 12/1977 | .......... 43/17 |
| DE | 37 07 988 | | 9/1988 | |
| FR | 2 472 916 | | 7/1981 | |
| GB | 1550913 | * | 8/1979 | .......... 43/17 |
| GB | 1 596 260 | | 8/1981 | |
| GB | 2166331 A | * | 5/1986 | .......... 43/17 |
| GB | 2211056 A | * | 6/1989 | .......... 43/17 |
| GB | 2219181 A | * | 12/1989 | .......... 43/17 |
| GB | 2 222 060 | | 2/1990 | |
| GB | 2222060 A | * | 2/1990 | .......... 43/17 |
| GB | 2248755 A | * | 4/1992 | .......... 43/17 |

* cited by examiner

*Primary Examiner*—Kurt Rowan
(74) *Attorney, Agent, or Firm*—Brian Beverly; Beeson Skinner Beverly, LLP

(57) ABSTRACT

The present invention is a device for detecting the presence of a fish on a fishing line, comprising a sensor for measuring tension on the fishing line and generating an electronic signal related thereto. The signal is processed by a filter circuit which removes signal components caused by environmental conditions such as winds, wave and current action, boat drift or snags. The filter circuit produces a signal output only if the tension reading is characteristic of a fish bite on the line. The preferred form of the invention includes two parts: a detecting and transmitting device for attachment to a fishing rod, and a receiving device which also functions as a storage box. A rotatable control is provided for adjusting the sensitivity of the device. The filter output is encoded by the transmitting device, and transmitted as radio waves. The radio waves are received by the receiving device, converted back into an electric signal and decoded. When an appropriate signal is received, either a buzzer or a vibrator is activated to alert the user that a fish is on the line. A toggle switch enables the user to choose whether the buzzer or the vibrator will be activated.

35 Claims, 9 Drawing Sheets

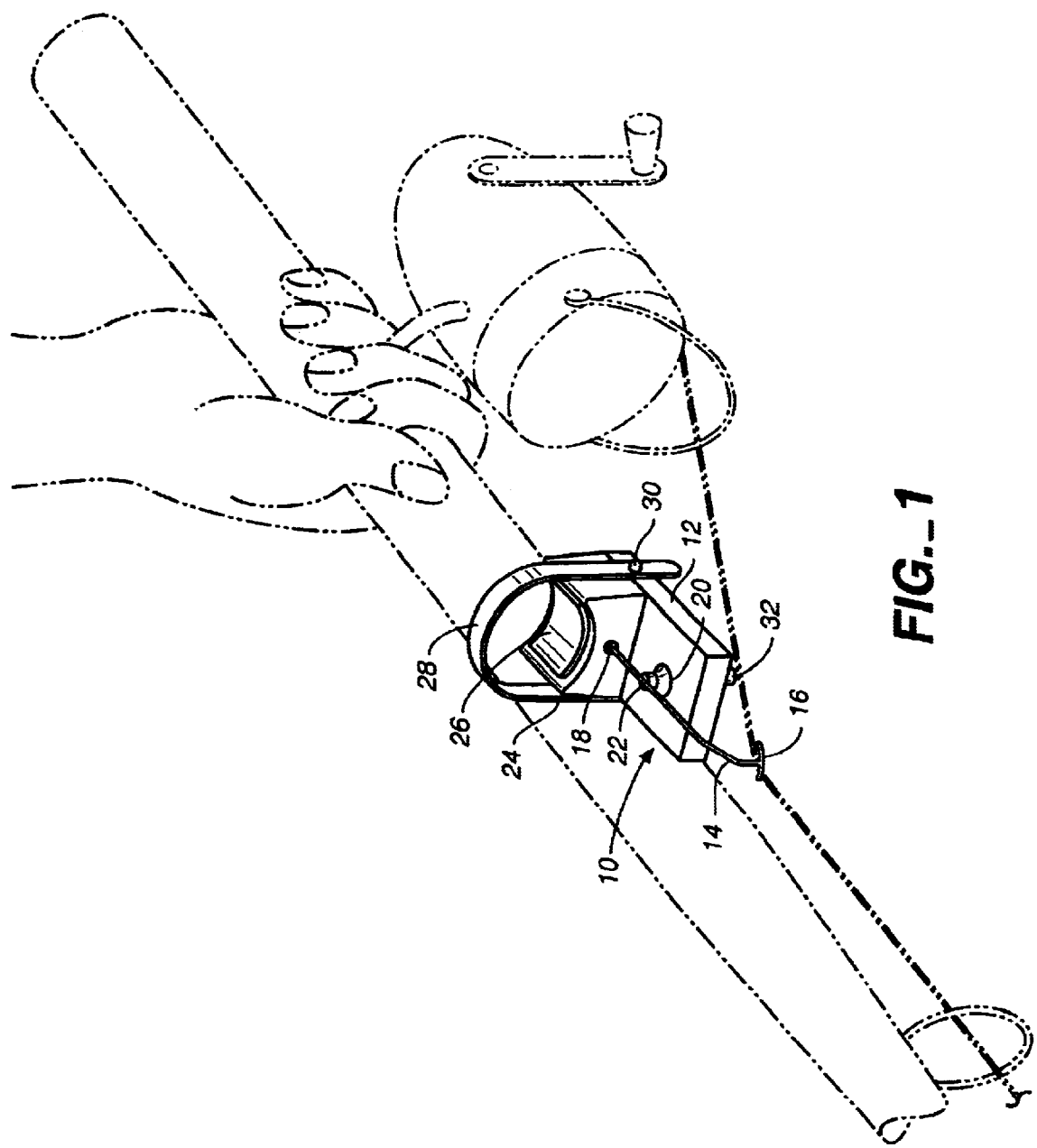
FIG._1

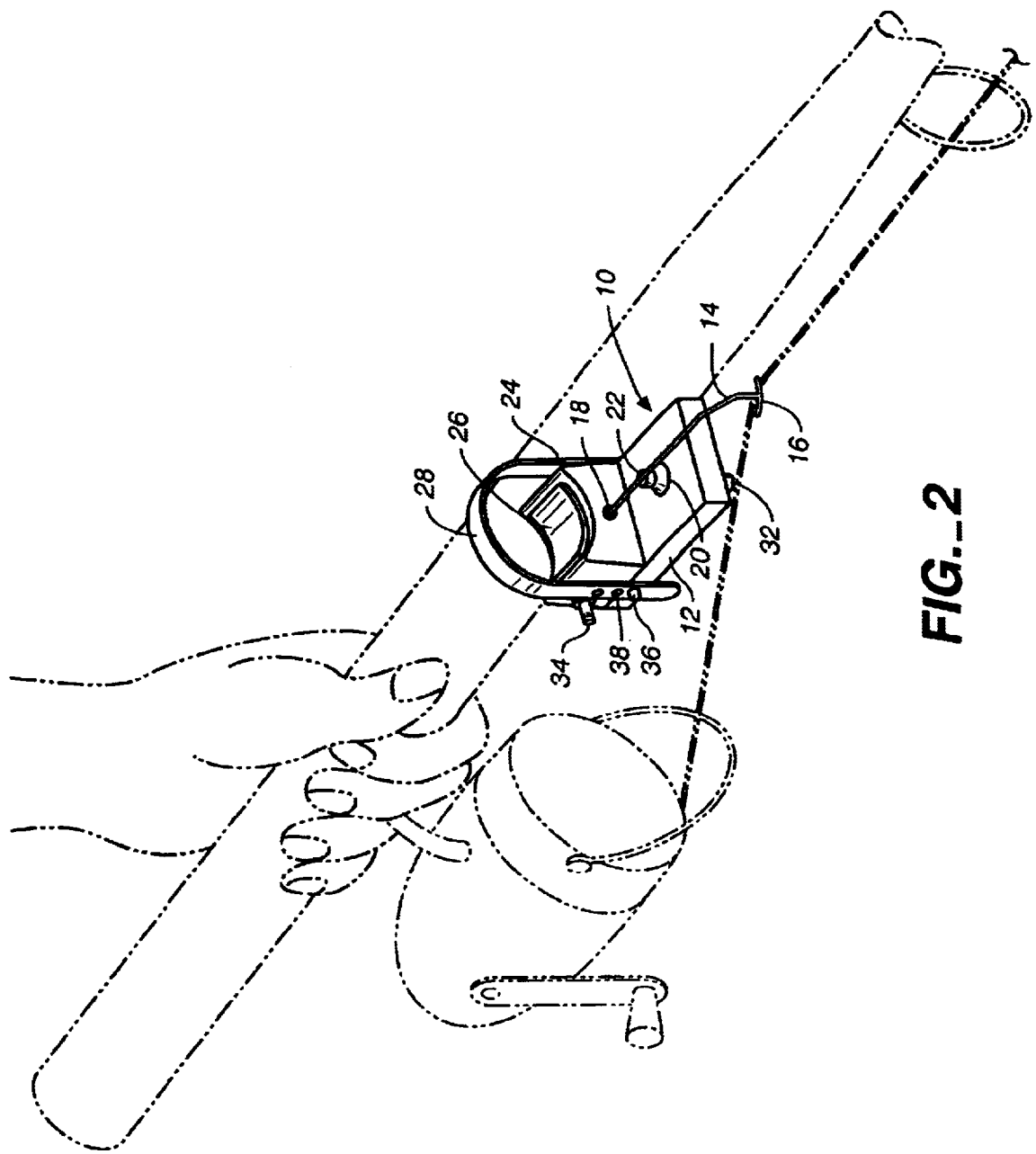
FIG._2

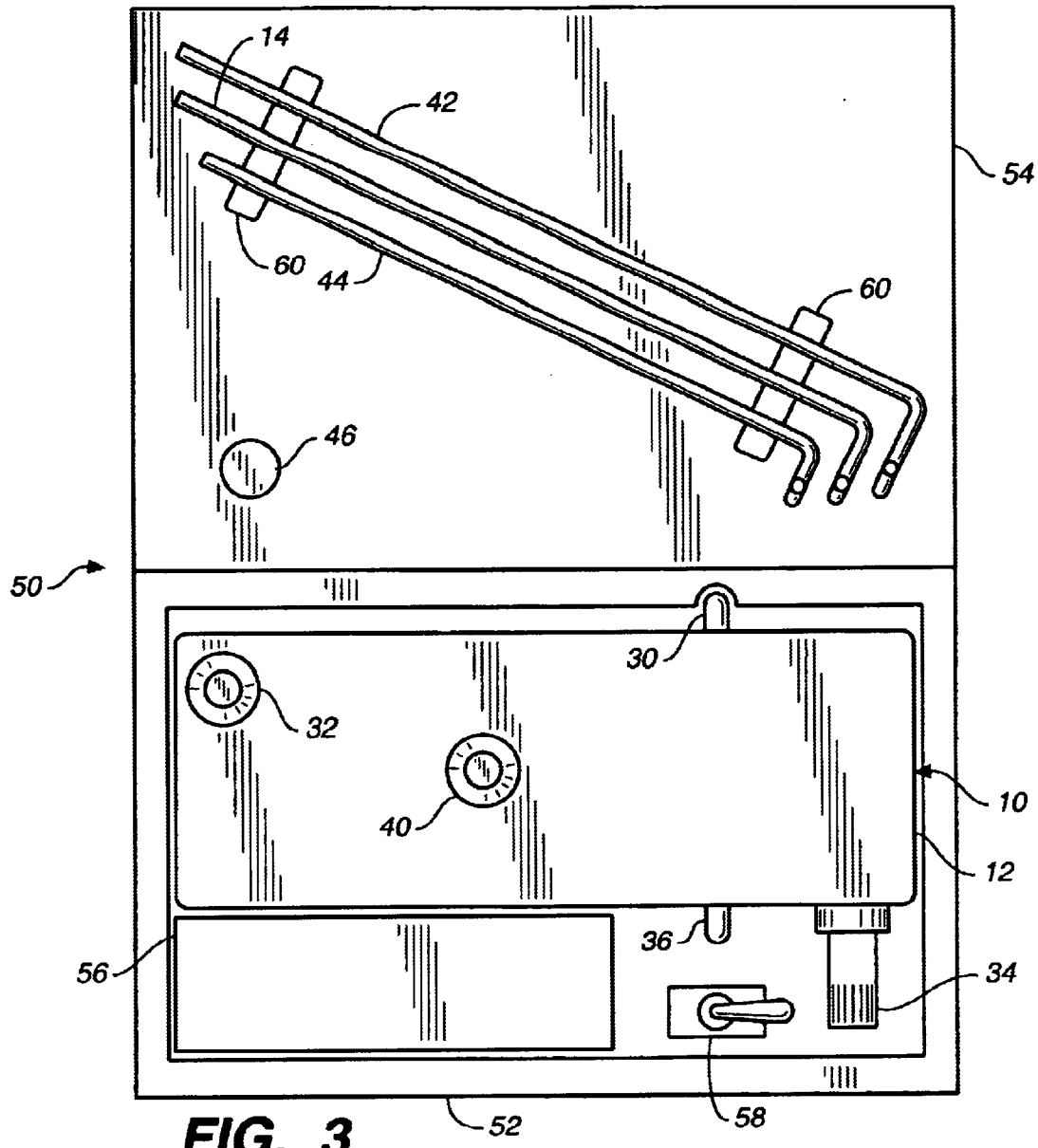
FIG._3
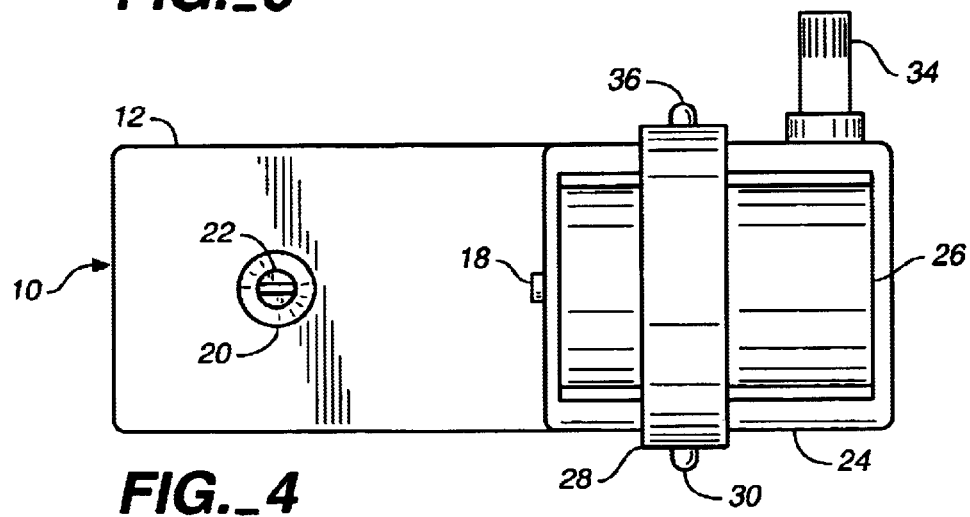
FIG._4

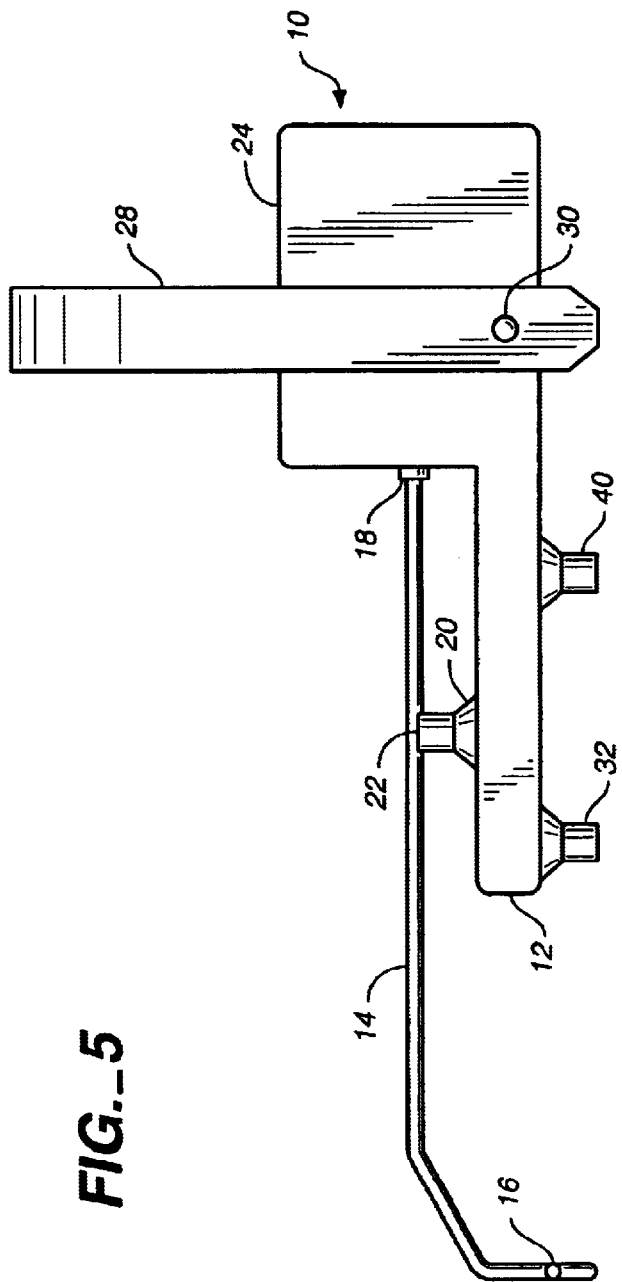
FIG._5
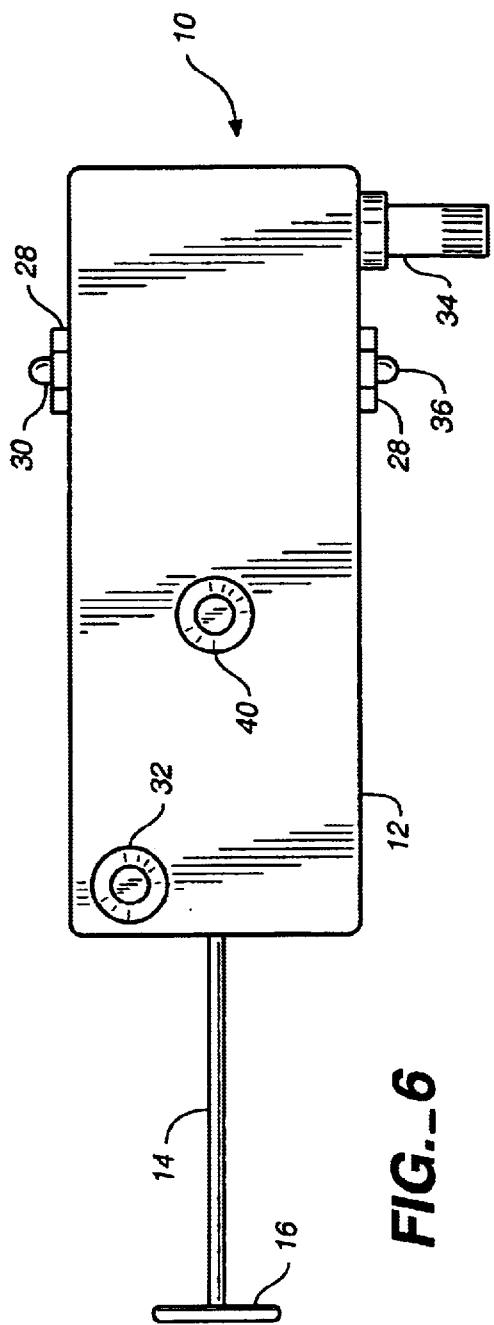
FIG._6

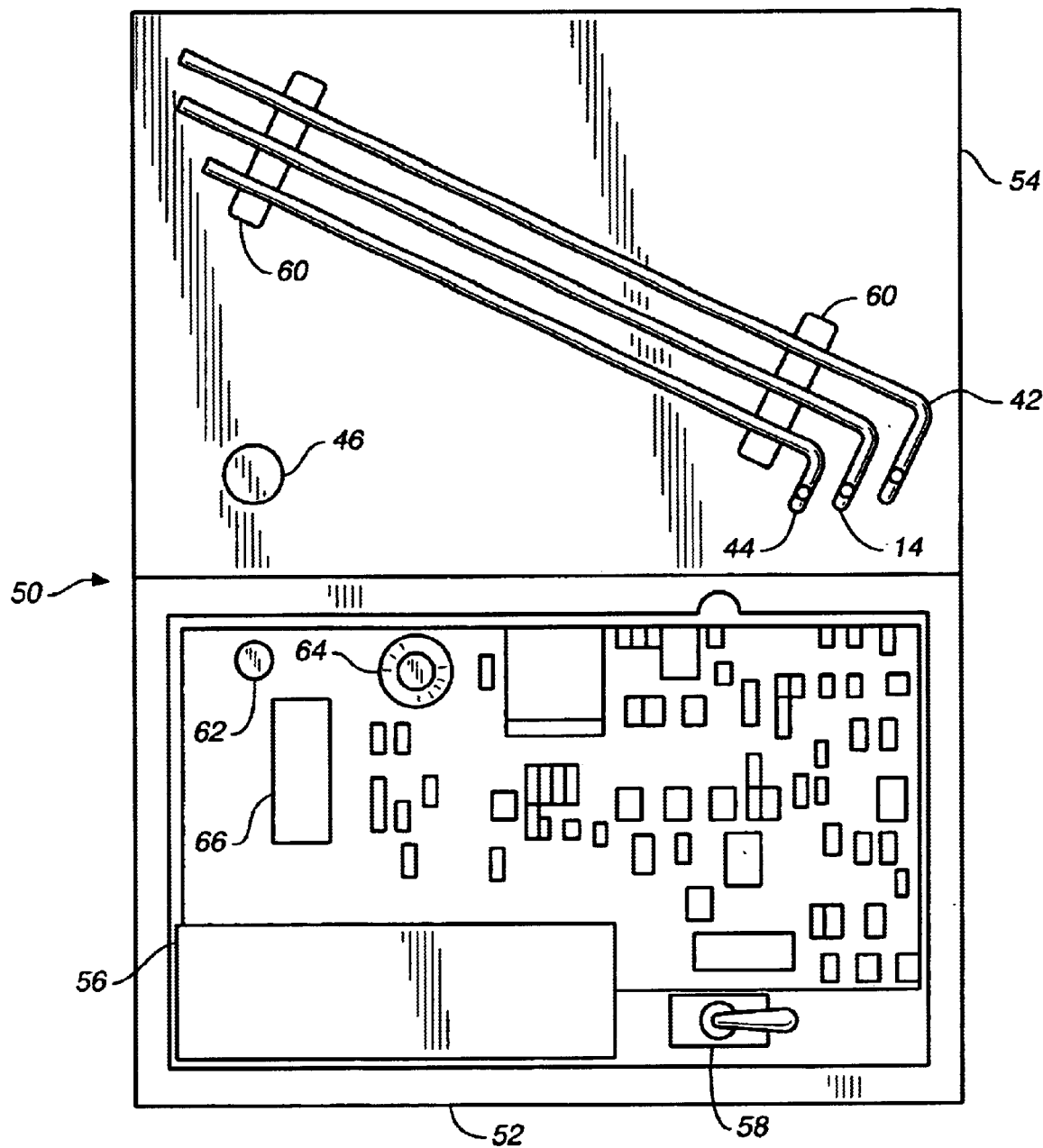
FIG._7

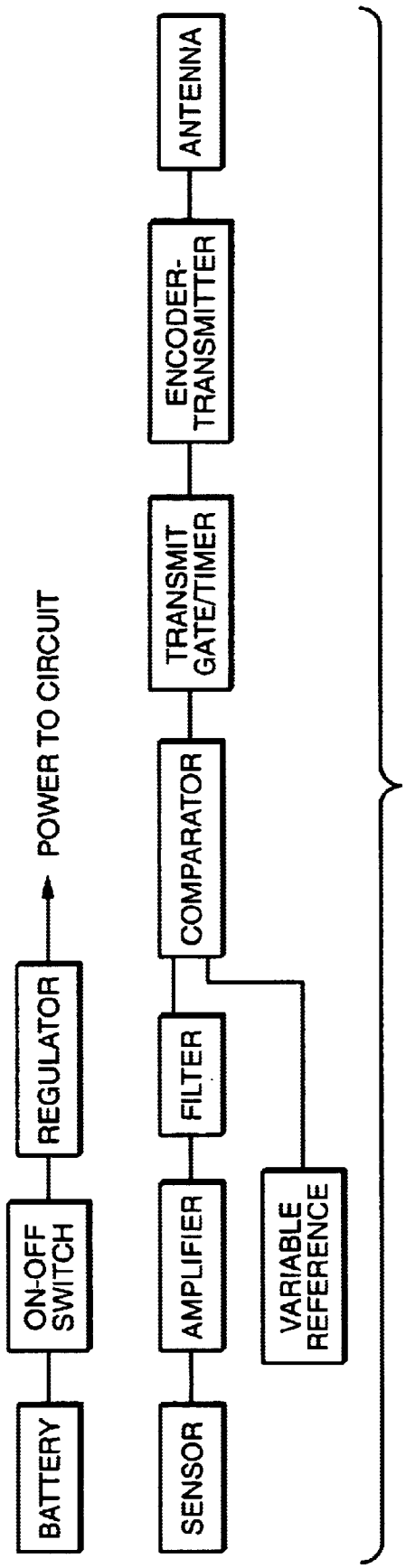
FIG._8
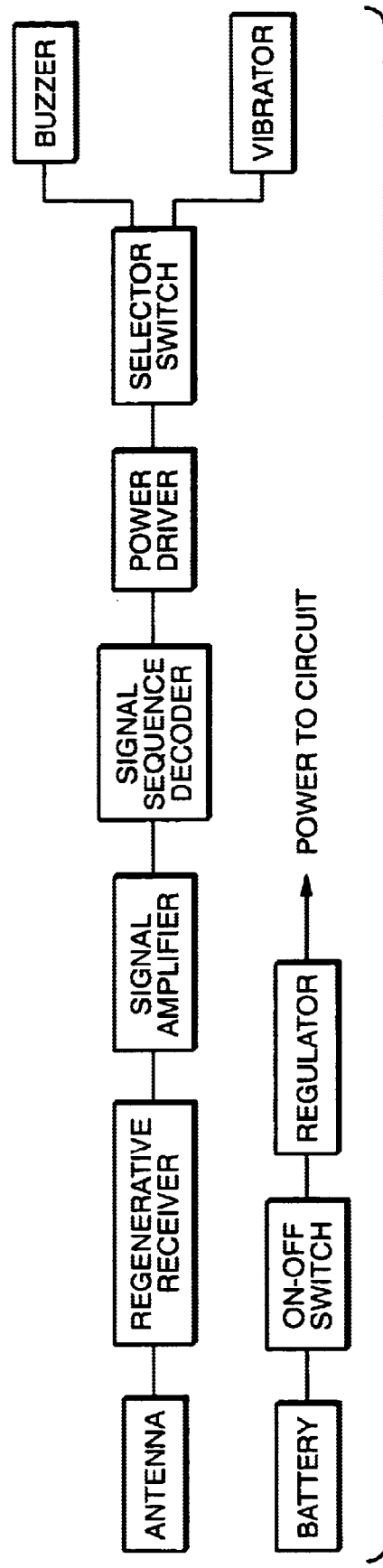
FIG._10

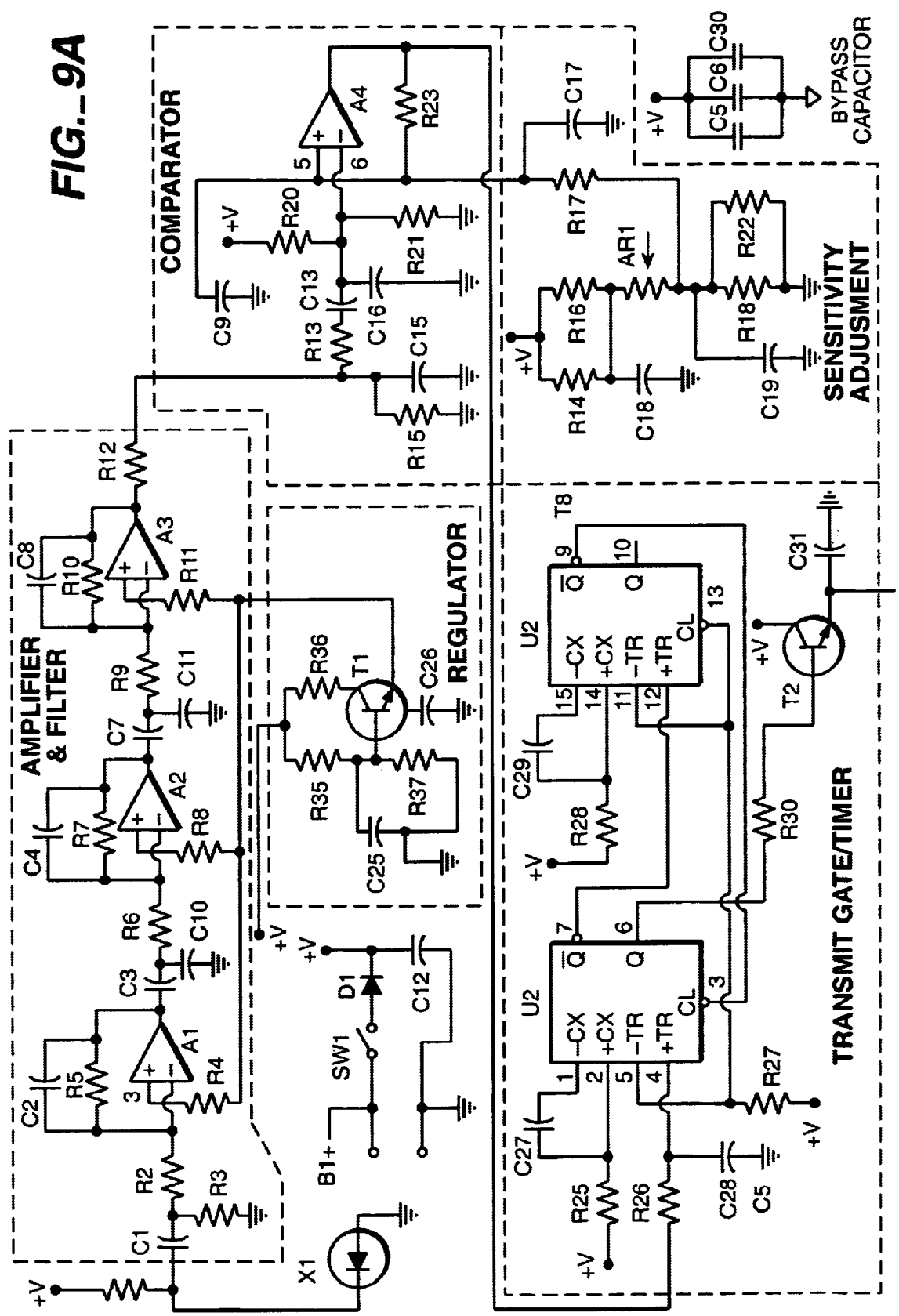

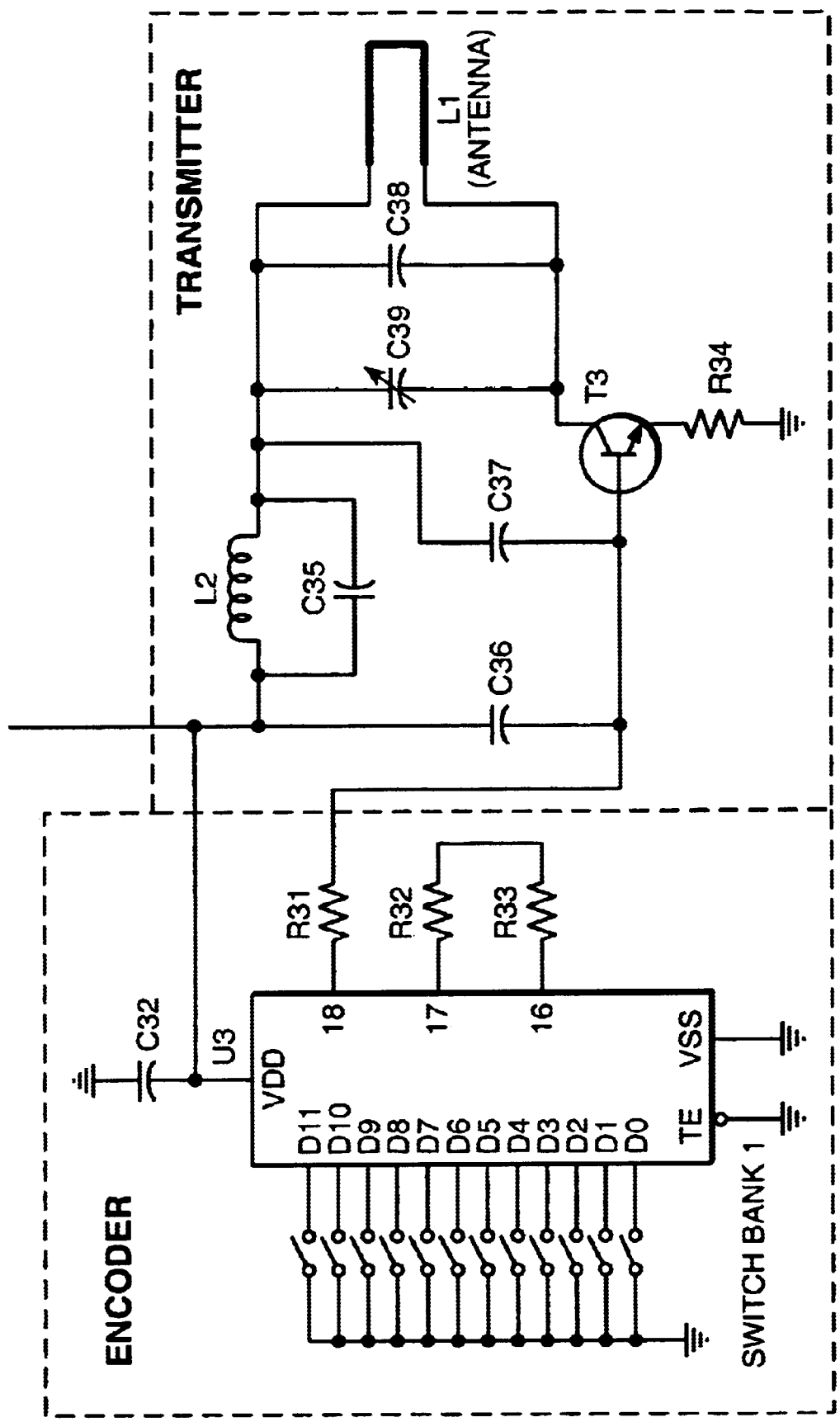
FIG._9B

FISH BITE DETECTOR

BACKGROUND OF THE INVENTION

1. Field of the Invention

The present invention relates to a device for detecting the bite of a fish on a fishing line by monitoring tension on the fishing line and generating an alarm if tension on the line is characteristic of a fish bite. The invention relates in particular to electronic circuitry components which filter signals received in response to tension on the fishing line such that an alarm is generated only when the fishing line is tensed in a way characteristic of a fish bite. The invention includes a transmitting device for sending a radio signal when a bite is detected, and a receiving device for receiving the radio signal and converting it into a signal perceivable by a human user.

2. Description of the Prior Art

While there are various devices in the prior art for alerting a user to the presence of a fish on a fishing line, none are as capable as the present invention of being adjusted to distinguish the different types of pull put on the line by environmental factors such as wind, wave, and current, from the fish trying the bait. This is done by measuring the tension on the line.

U.S. Pat. No. 3,559,327, issued on Feb. 2, 1971 to Bernard A. Christopher, discloses a fish warning device, in which the tug of a fish on the line is detected by the movement of a pendulum closing, an electrical circuit, causing a warning bell to sound. It is distinguishable from the preferred embodiment of the instant invention, in which tension in the line is detected by a piezoelectric crystal. The instant invention is also distinguishable in that it includes circuits for filtering out irrelevant signals.

U.S. Pat. No. 4,422,258, issued on Dec. 27, 1983 to Bill R. Adams and William C. Burchett, discloses a device which uses springs to measure the force of the pull of a fish on a line, with different colored lights being turned on when electric circuits are closed as the springs are compressed to certain points, and a moving scale indicating the force of the pull.

U.S. Pat. No. 4,586,284, issued on May 6, 1986 to Samuel M. Westwood III, discloses a fishing line signaling device with a switch arm that frictionally grips the fishing line and is spring biased with a knob and screw to vary the frictional force of the grip on the line. It is distinguishable from the preferred embodiment of the instant invention in that line motion pulls the line out from under a spring arm causing a switch to throw thereby closing an electric circuit to actuate an alarm.

U.S. Pat. No. 4,731,946, issued on Mar. 22, 1988 to Donald J. Blythe and Frank E. J. Sams, discloses a bite indicator for a fishing line, with a piezoelectric strain sensing element that causes a light emitting diode to be turned on and/or an audio alarm to sound when the fishing rod flexes. It is distinguishable from the instant invention in that line tension is not measured, there is no radio connection between the sensing device and the device producing a signal for the human user, and circuits equivalent to those for the adjustment of environmental sensitivity, deciphering of the electronic impulses, and the encoded transmitting and receiving systems of the instant invention are not disclosed.

U.S. Pat. No. 5,010,678, issued Apr. 30, 1991 to Jeffrey A. Peck and William R. Thurston, discloses bite indicators for sensing movement or vibration on a fishing line, with various sensing devices and LED or sound output devices. Line tension is not measured, the radio connection of the instant invention is not disclosed, nor are circuits equivalent to those of the instant invention disclosed.

U.S. Pat. No. 5,088,223, issued on Feb. 18, 1992 to Tak Y. W. Chu, discloses a fishing accessory for detecting movement of a fishing line, where movement is detected by arms that pivot when the line moves.

U.S. Pat. No. 5,261,180, issued on Nov. 16, 1993 to Brian Foster and Randy W. Carrier, discloses a fish bite signal apparatus enclosed in a rectangular box that is clamped above a fishing rod. It is distinguishable from the instant invention in that any line movement closes an electric circuit to tripper an alarm and it does not include circuits for filtering out irrelevant movements or "noise."

U.S. Pat. No. 5,274,943, issued on Jan. 4, 1994 to Michael P. Ratcliffe, Ralph D. Ratcliffe, Timothy R. Ratcliffe and Wayne A. Ratcliffe, discloses an indicating device for fishing rods, which detects motion in a fishing rod from a fish pulling on the fishing line, and does not include circuits equivalent to those in the instant invention for filtering out irrelevant movements or "noise."

U.S. Pat. No. 5,293,710, issued on Mar. 15, 1994 to Joseph P. Mills, discloses a fishing pole strike indicator which reacts to movements in the fishing pole detected through a spring mounted probe, rather than directly detecting movement in the fishing line itself as does the instant invention.

U.S. Pat. No. 5,321,903, issued on Jun. 21, 1994 to Warren R. Ebener, discloses a device for signaling an increase in fishline tension wherein the fishing, line is clamped by a pivoting arm. When tension on the line increases above a preselected threshold, the line is released causing a circuit to close to illuminate a light The gripping force on the line is set mechanically using a rack and pinion gear.

U.S. Pat. No. 5,341,589, issued on Aug. 30, 1994 to Manuel Gutierrez, discloses a fishing rod holder and stand, including an alarm activated simply by a switch closing when there is movement on the fishing line, without electronic circuits to distinguish insignificant movements, as in the instant invention.

U.S. Pat. No. 5,396,726, issued on Mar. 14, 1995 to Lawrence Zepeda, Sr., discloses a fish bite detector with an oscillating arm that contacts a fishing line and activates an alarm when movement of the arm closes an on/off switch, without adjustable means for filtering out insignificant movement as in the instant invention.

U.S. Pat. No. 5,450,687, issued on Sep. 19, 1995 to Clifford R. Fox, discloses a bite indicator which signals motion on a fishing line by mechanical means, i.e., the pivotal movement of a line management device.

French Patent No. 2,472,916, dated July 1981, discloses an electronic fishing bite detector which detects movements of the fishing rod, rather than directly detecting movements of the fishing line as does the instant invention.

British Patent No. 1,596,260, dated August 1981, discloses a bite indicator for a fishing rod having a piezoelectric element in contact with a deflectable member to produce a signal when the line moves, but without the adjustable means for filtering out irrelevant movements of the instant invention German Patent No. 37 07 988, dated September 1988, discloses a device using a piezoelectric crystal for detecting movements in a fishing rod, rather than directly detecting movements in a fishing line as in the instant invention.

British Patent No. 2 222 060, dated February 1990, discloses a bite indicator having a vibratable member such as a piezo-electric element mounted in direct contact with a fishing line for generating an electrical signal in response to vibration of the member. The instant invention is distinguishable because it measures line tension rather than vibration and has adjustable electronic means for filtering out irrelevant amounts of and changes to tension in the fishing line.

None of the above inventions and patents, taken either singly or in combination, is seen to describe the instant invention as claimed.

SUMMARY OF THE INVENTION

The present invention is a device for detecting the presence of a fish on a fishing line, generally comprising a sensor for measuring tension on the fishing line and generating an electronic signal related thereto, and a filter circuit which removes signal components caused by environmental conditions such as winds, wave and current action, boat drift or snags. The preferred form of the invention comes in two parts: a detecting and transmitting, device which can be attached to a fishing rod, and a receiving device which also functions as a storage box that can be clipped to a user's belt like a pager.

The tension sensor includes an arm mounted parallel to the fishing rod. The arm has projections at its free end for engaging the fishing line. The mid-portion of the arm impinges on a piezoelectric crystal or other device sensitive to pressure. The sensing device produces an electric signal related to line tension which is processed by the filter circuit. The filter circuit, acting as a bandpass filter removes undesirable component parts of the signal caused by environmental elements, and passes through a trigger signal only if it is characteristic of line tension caused by the abrupt pull of a fish strike on the line. The trigger signal is then encoded and transmitted as radio waves. The radio waves are received by the receiving device, converted back into an electric signal, and decoded. When trigger signal is received, either a buzzer or a vibrator is activated to alert the user that a fish is on the line or interested in the bait.

Accordingly, it is a principal object of the invention to provide new and improved means for alerting a user to the presence of a fish on a fishing line.

It is another object of the invention to provide a new and improved means for measuring the tension on a fishing line to trigger an alert that a fish bite has occurred on the line.

It is a further object of the invention to provide new and improved means for processing signals received from a sensing device.

It is yet another object of the invention to provide an electronic signal related to tension in a fishing line and to process the signal through filter circuitry to remove component signal parts caused by environmental elements such that only signals characteristic of a fish bite on the line are passed through the filter circuitry.

It is a further object of the invention to provide a fish bite detector which includes an encoded radio link.

Still another object of the invention is to provide a fish bite detector that can be adjusted to eliminate all environmental false readings from sources such as waves, winds, currents, and/or tidal action.

It is an object of the invention to provide improved elements and arrangements thereof in an apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

FIG. 1 is an environmental perspective view of the transmitting device from a first angle.

FIG. 2 is an environmental perspective view of the transmitting device from a second angle.

FIG. 3 is a top view of the receiving box, containing the transmitting device in an upside-down position.

FIG. 4 is a top view of the transmitting device.

FIG. 5 is a left side elevational view of the transmitting, device.

FIG. 6 is a bottom view of the transmitting device.

FIG. 7 is a top view of the receiving box, without the transmitting device enclosed.

FIG. 8 is a block diagram of the transmitting system.

FIGS. 9A and 9B are a circuit diagram of the transmitting system including the filter circuit, with the broken line indicating where FIG. 9A is continued in FIG. 9B.

FIG. 10 is a block diagram of the receiving system.

Similar reference characters denote corresponding features consistently through the attached drawings.

DETAILED DESCRIPTION OF THE PREFERRED EMBODIMENT

Figure 11:
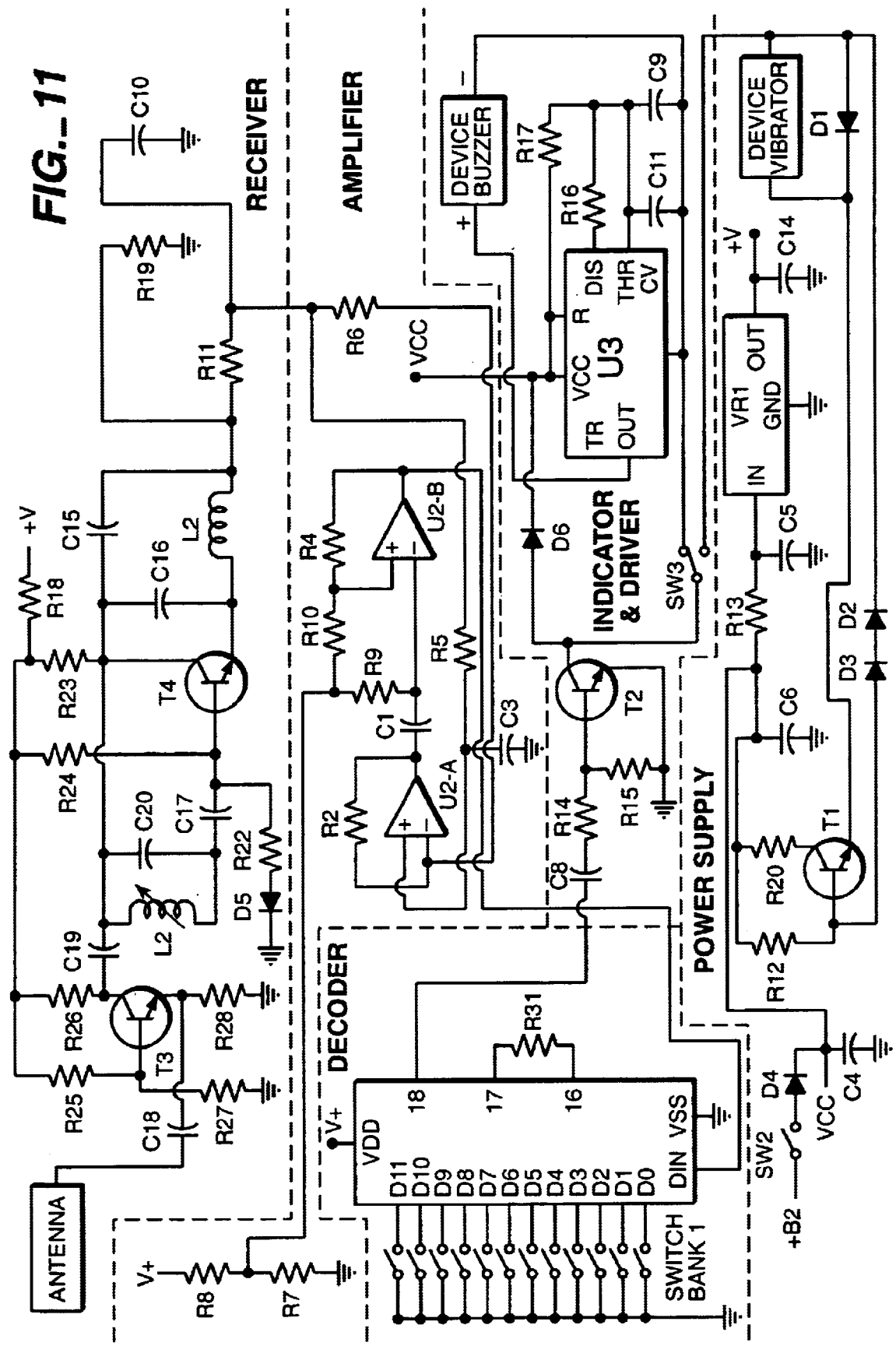
FIG. 11 is a circuit diagram of the receiving system.

The present invention is a device for detecting tension in a fishing line, producing a signal related to the tension, filtering the signal to produce an output signal indicative of a particular kind of line activity which it is desired to detect, such as a fish bite on the fishing line, and producing a warning perceptible by a user of the device that the particular activity has been detected. The preferred form of the device encrypts the signal and transmits it by radio frequency to a received component proximate the user where it is deciphered to exclude unrelated transmissions from other sources.

The preferred embodiment includes a transmitting device and a box including a receiving device. FIG. 1 shows the transmitting device 10 attached to a fishing pole and fishing line shown in broken lines. The transmitting device also functions as a device for sensing tension in the fishing line. The device has an L-shaped main body 12, and an actuating arm 14 which is attached to the fishing line by a hook 16 and attached to the main body by insertion into a socket 18. The L-shaped main body 12 consists of base member 12A and an upstanding member 12B. The base member 12A and the upstanding member 12B are disposed in perpendicular relation to each other. The hook 16 has oppositely disposed synclinal projections so that the line can quickly come off in whichever direction the bail is turned. The line can also be removed by hand. A sensing pole 20 rises from the main body, and has a V-shaped notch 22 on its upper surface in which the actuating arm rests. The lower portion of the sensing pole 20 rests on a sensor (not illustrated), a piezoelectric crystal in the preferred embodiment, in the main body 12. The sensor detects pressure caused by movement of the arm 14 against the upper surface of the sensing pole 22. The sensor produces a signal providing an accurate measure of the force bearing on the arm caused by tension on the fishing line and all changes to the line tension. The sensing pole may be made entirely of plastic or, alternatively, it may have a central metal rod (not shown) that at its upper end contacts the actuating arm at a right angle, and at its lower end contacts the piezoelectric crystal. An elevated portion 24 extends from the main body and is curved to receive a fishing pole on a pad 26. The device is detachably secured to the fishing pole with a strap 28. A first prong 30 extends from the main body and passes through the strap. The position of the device under the fishing pole makes it easier to cast the fishing line. An on/off switch 32 extends downward from the main body. The device is dust- and moisture-proof, and it will float in the water, so that, it will not be easily damaged or lost if it falls in the water.

FIG. 2 shows the other side of the transmitting device. A sensitivity control 34 allows a fisherman to manually adjust the sensitivity of the device to filter out varying signal components representative of the environmental conditions. A second prong 36 extends from the main body and can be inserted through a plurality of holes 38 to allow the strap to be adjusted to fit different sizes of fishing poles. In other embodiments, the device is attached to the fishing rod using a hook-and-loop-type fastener, an adjustable belt and buckle, a ratchet, or any other kind of fastener allowing the device to be firmly but removably attached to the rod.

FIG. 3 shows a top view of the receiving box 50, containing the transmitting device as it is stored in an upside-down position. The receiving box also functions as a storage box. The receiving box has a main portion 52 and a lid 54. When the lid is closed, the elevated area 46 on the lid automatically pushes the on/off switch 32 to turn the device off. When the lid is opened and the pressure on the on/off switch is released, the device is automatically turned back on. There is also a center prong 40 extending from the main body 12 which can be used to pull the transmitting device out of the receiving box. A medium-sized actuating arm 14, a large-sized actuating arm 42, and a small-sized actuating arm 44 are retained on the lid by holders 60. Contained within the main portion of the receiving box are a battery pack 56 and a toggle switch 58.

FIG. 4 provides a top view of the transmitting device.

FIG. 5 provides a left side view of the transmitting device.

FIG. 6 provides a bottom view of the transmitting device.

FIG. 7 shows the receiving box 50 without the transmitting device. A second on/off switch 62 is normally on, but is depressed and thereby turned off by pressure from the main body of the transmitting device when it is stored in the receiving box in the position indicated in FIG. 3. The toggle switch 58 in a first position causes the buzzer 64 to be connected, and in a second position causes the vibrator 66 to be connected. When the buzzer is connected, it will emit an audible sound when relevant tension (as explained infra) is detected on the fishing line. When the vibrator is connected, it will vibrate to alert the user when such line tension is detected. The buzzer or vibrator will also be activated when the receiving box is opened.

FIG. 8 gives an overview of the electrical circuitry portion of the invention. The device of the present invention, once attached to a fishing rod, senses the bite of a fish and alerts the fisherman that a bite has occurred. Tension on the fishing line is caused by many different factors, including environmental conditions and fish bites. The line tension is transmitted to the actuating arm 14 which in turn presses down on the sensing pole 22 thereby creating pressure on the sensor. The sensor produces an electronic signal which provides an accurate measure of the amount of tension on the line and the duration of and changes to the line tension. The signal is then processed by filter circuitry which removes signals characteristically produced by ambient environmental factors such as winds, waves, current action, buoyancy, drift, and snags by filtering the sensed signals electronically. After the ambient signals are filtered out, the filter output is then compared to a variable reference signal by the comparator which in the preferred embodiment is a voltage level. If the filter output exceeds the reference signal, the comparator passes on the filter output signal. Otherwise, the comparator passes no signal. The filtration and comparison functions establish qualitatively whether the filter output is characteristic of signals produced by a fish bite on the fishing line. If the comparison is favorable the comparator produces a trigger signal that activates an alarm alerting the fisherman of a high likelihood of a fish bite. The experienced fisherman will appreciate the ability of the instant device to "feel" the line, and subsequently alert the fisherman either audibly, or tactilely.

FIG. 8 is a block diagram of the transmitting system. A battery supplies direct current when an on/off switch is closed, which passes through a regulator to power the transmitting system circuit. A sensor detects tension in the fishing line, and sends an electric signal to a filter-amplifier where the signal is filtered and amplified. A variable reference (set by the sensitivity control 34 described supra) is used by a comparator to determine whether to pass the filtered signal on through toga transmit gate/timer or to suppress it. The transmit gate/timer provides a signal to an encoder-transmitter, which encrypts the signal and converts the electrical signal to radio frequency electromagnetic waves, which are transmitted through an antenna.

FIGS. 9A and 9B are a circuit diagram of the transmitting system. Direct current is supplied from battery B1 when switch SW1 is closed. The current passes through a polarity protection diode to the regulator which provides power to the four-stage filter amplifier and comparator, A1 through A4 and the dual one-shot U2.

Power to the encoder chip and tile radio transmitter are provided by the transistor T2 when an appropriate signal is detected.

Electromagnetic signals are generated by the transducing element X1. The signals are capacitively coupled by C1 to A1 (and its supporting components C2, C3, R2, R4, and R5), the first-stage filter-amplifier. Each successive stage, A2 and A3, further amplifies the signal to a range of voltage that is appropriate for output to tile comparator (discussed infra) and filters the signal to pass only frequency patterns characteristically produced by a fish bite on the fishing line.

This processed signal is presented to a final noise filter C13, C16 and R13, and to the negative input of the comparator A4. The positive input of the comparator A4 is connected to the movable arm of the sensitivity adjustment AR1. AR1 is the adjustable component of a resistor divider network (including R14, R16–18, and R22) which determines the range of the voltage swing of AR1. AR1 is adjusted by the user to select the optimum sensitivity considering all the existing environmental conditions, including but not limited to wind, waves and tides. Adjusting AR1 sets the trigger level in the comparator A4.

When an incident signal of the same voltage level as that set by AR1 is presented to pin 6 of A4, tile comparator triggers, sending a pulse to tile first one-shot U2 and pin 4. Pin 6 of U2 goes positive for the duration of the one-shot timer, which in the preferred embodiment is one-half second. This one-half second pulse is connected to the base of transistor T2, which then provides power for the encoder and radio transmitter for that time frame.

Pin 7 of the first one-shot U2 is connected to pin 12 of the second one-shot U2, causing a pulse to be generated at pin 9 of the second one-shot U2 after the one-half second time frame has passed. This is connected back to the clear input at pin 3 of U2, holding pin 4 of U2 in a cleared status for a time period of one second in the preferred embodiment, and preventing continuous triggering when there are several signals of interest in rapid succession.

The encoder circuit U3 consists of a plurality of binary select inputs, Switchbank 1, which are present in production to distinguish one transmitted from another. There are a total of 4096 possible combinations, and these combinations result in different portions of the output waveform being high or low. The frequency of the high/low pulses can be varied by changing the values of R32 and R33, which are connected to pins 16 and 17 of U3. The encoder circuit generates approximately ten sets of encoded pulses for the one-half second duration of the one-shot pulse from pin 6 of U2.

The radio transmitter includes four filter and frequency ranging capacitors C35–38, an inductor L2, a frequency trimming capacitor C39, and a driver transistor T3. The antenna L1 is an integral part of a printed circuit board. Preferably, the radio transmitting and receiving systems are tuned for the 300 megahertz range, a frequency band approved for remote control devices.

The encoded waveform from the OUT pin of U3 is coupled to the transmitter's alternating current reference line and to the base of transistor T3. This encoded waveform causes the modulation of the 300 megahertz radio frequency and broadcasts a signal detectable by the receiving system.

FIG. 10 is a block diagram of the receiving system. A battery supplies direct current when an on/off switch is closed, which passes through a regulator to power the receiving system circuit. The radio signals from the transmitting system are picked up by an antenna, converted back to an appropriate electrical signal by the regenerative receiver, and amplified by the signal amplifier. The signals are then decoded by the signal sequence decoder. The decoded signals are then sent to a power driver, which energizes either a buzzer or a vibrator, depending on how a selector switch is set by the user.

FIG. 11 is a circuit diagram of the receiving system. Direct current is supplied from the battery B2 when the switch SW2 is closed. Current passes through the polarity protecting diode D4 and the voltage regulator VR1. VR1 supplies current to all active components and references.

When a radio signal of the frequency range of interest is received and amplified, it is passed to the decoder integrated circuit U1. U1 is connected to a plurality of binary select switches, Switchbank 1, which are set during manufacture to distinguish one receiver from another. There are a total of 4096 possible combinations, and these combinations result in only one setting (that matching the transmitting system) which will result in an output pulse on pin 18 of U1. Tile frequency range of the allowable incident signal is set by the value of resistor R3 between pins 16 and 17 of U1.

The output signal from pin 18 of U1 drives the base oft a power transistor T2, which can drive a plurality of indicating devices, as selected by the user with switch SW2.

In the preferred embodiment, the sensor uses a piezoelectric crystal to detect changes in the tension in the line resulting, from a fish pulling on it, as described supra, but other kinds of sensing devices can be used, in all of which signals are triggered at points determined by the filter and variable reference, including but not limited to:

1. A microphone, with the loudness and/or frequency of sound picked up by the microphone triggering the transmitter.

2. A pendulum with either variable resistance related to the degrees that the pendulum swings, or else an on/off switch closed when the pendulum swings past a set point.

3. A photo sensor, which converts the amount of light received to an input signal.

4. A pressure sensor in which the pressure in fluids is monitored and converted into an input signal.

5. A moisture sensor, giving either an analog or a digital signal in response to changes in moisture.

6. A mercury tilt switch sensor, with an on/off switch that is closed when the tilt passes a set angle.

7. A multi-position array of sensors, including a pendulum and arrays of infrared emitting and detecting diodes, that can detect a wide range of angle changes.

8. A magnetic reed switch sensor, with a switch comprising a pair of magnetic reeds that is closed when the magnetic field is strong enough to pull the reeds together, and is opened when the magnetic field is weakened so that the reeds are pulled apart.

9. A vane air flow sensor, with a vane/spring arrangement that changes a variable resistor creating a signal proportional to air flow.

10. A tension sensor, with changing tension causing changes in electrical resistance which cause changes in voltage.

It is to be understood that the present invention is not limited to the embodiments described above, but encompasses any and all embodiments within the scope of the following claims.

What is claimed is:

1. A fish bite detector for detecting the occurrence of fish bites comprising:

a housing having an L-shaped body including a base member and an upstanding member, said upstanding member including a curved top surface for securing a fishing rod, and said base member extending perpendicularly from said upstanding member;

adjustable strap means for securing said housing to the fishing rod;

an actuating arm having a first end removably coupled to said upstanding member, and a second end having means for engaging a line of the fishing rod;

a sensor mounted on said base member and engaging said actuating arm; and circuit means electrically communicating with said sensor for generating an alarm upon measuring acceleration, torque, duration of acceleration, and duration of torque on the line of the fishing rod to detect occurrence of a fish bite.

2. The fish bite detector according to claim 1, said circuit means comprising:

means responsive to said sensor for producing an electrical signal;

a filter circuit for enhancing said electrical signal;

a comparator circuit for comparing said electrical signal to a variable reference, and suppressing said signal if it falls outside a range of values set in accordance with said variable reference;

a transmitter circuit for converting said electrical signal into an electromagnetic radiation signal;

a receiver circuit for receiving said electromagnetic radiation signal and converting said electromagnetic radiation signal into another electric signal; and means responsive to said another electrical signal for producing the alarm indicative of a fish bite.

3. A fish bite detector, according to claim 2, further including a transmit gate/timer circuit having at least one one-shot integrated circuit chip for converting said signals from said comparator circuit into a timed pulse to said transmitter circuit.

4. A fish bite detector, according to claim 2, further including an encoder having a plurality of binary switches for encrypting said electrical signal before being converted into said electromagnetic radiation signal; and
said receiver circuit further including a decoder having a corresponding number of binary switches as said encoder for deciphering said another electrical signal before being converted into signals that can be perceived by the user.

5. A fish bite detector, according to claim 4, said receiver circuit further including an amplifier circuit for amplifying said another electrical signal.

6. A fish bite detector, according to claim 1, said circuit means including a switch for selectively switching between an audible alarm and a vibratory alarm.

7. A fish bite detector for use with a fishing rod and fishing line attached to the fishing rod, the fish bite detector comprising:
a tension sensor for mounting on the fishing rod, said tension sensor including an arm mounted parallel to the longitudinal axis of the fishing rod, the arm having a projecting portion extending from the arm for engaging the fishing line to sense tension in the fishing line, the projecting portion of the arm including a free end positioned between the fishing rod and the fishing line having oppositely extending synclinal projections, each projection inclined toward the fishing rod, such that the fishing line is displaced toward the fishing rod when engaged by one of the projections, the tension sensor producing a continuous sensor output related to the tension in the fishing line,
a housing for demountably attaching said sensor and said arm to the fishing rod between the fishing rod and the fishing line, said housing having a base and an upright portion, said upright portion having a concave surface for mounting said housing to the fishing rod, and said sensor fixed to said base,
a filter circuit having three stages for receiving said sensor output and for effectively removing from the sensor output signal components generated by extraneous environmental elements and for producing a detectable filter output in response to any change in tension in the line that substantially matches a predetermined tension change characteristic of a fish bite on the line,
a warning means comprising an encoder for receiving said filter output and for producing a coded output, a transmitter circuit for receiving said coded output and for generating an electromagnetic radiation signal representative of said coded output, a receiver circuit for receiving said electromagnetic radiation signal and for regenerating said coded output, and a decoder for receiving said coded output and for decoding said coded output to reproduce said filter output, said warning means for producing a perceptible warning on detection of a change in tension in the fishing line that is characteristic of a fish bite, and
a storage container having said receiver circuit and said decoder, said storage container further including an interior compartment sized to removably receive and store said housing.

8. The fish bite detector of claim 7 wherein:
said housing floats and said storage container floats.

9. The fish bite detector of claim 7 wherein:
said transmitter circuit and said encoder are physically separate from said storage container for attachment to the fishing rod; and
said storage container has a belt clip to facilitate portability of said receiver circuit and said decoder independently of said transmitter circuit and said encoder.

10. A fish bite detector kit comprising:
a tension sensor for mounting to a fishing rod between the fishing rod and a fishing line on the rod, the tension sensor including a plurality of interchangeable arms, each of the arms when mounted disposed through its entire length parallel to the longitudinal axis of the fishing rod, each arm having a pair of oppositely extending projections, each projection extending approximately perpendicularly from the arm and disposed perpendicularly to the longitudinal axis of the fishing rod, the projections inclined toward the fishing rod for engaging a fishing line of a fishing rod to sense tension in the fishing line, the tension sensor producing a continuous sensor output related to tension in the fishing line,
a filter circuit for receiving the sensor output and acting to effectively remove from said sensor output signal components generated by extraneous environmental elements, the filter circuit producing a detectable filter output in response to any change in tension in the fishing line that substantially matches a predetermined tension change characteristic of a fish bite on the line,
a comparator for receiving the filter output of the filter circuit and for providing a predetermined reference which is compared to the filter output, the comparator generating a trigger signal when the filter output reaches a threshold defined by the predetermined reference, and
detecting means for detecting the trigger signal and generating a perceptible warning upon detection of the trigger signal.

11. The fish bite detector kit of claim 10 wherein:
said filter circuit comprises three stages.

12. A method for detecting a fish bite on a fishing line attached to a fishing rod comprising:
mounting a tension sensor to the fishing rod parallel to the fishing rod's longitudinal axis for sensing tension in the fishing line,
engaging the fishing line to the tension sensor,
producing a continuous sensor output related to the tension in the fishing line,
effectively filtering out from the sensor output components generated by extraneous environmental elements,
producing a detectable filter output in response to any change in tension in the line that substantially matches a predetermined tension change characteristic of a fish bite on the line,
receiving the filter output,
comparing the filter output to a predetermined reference,
generating a trigger signal when the filter output reaches a threshold defined by the predetermined reference,
receiving said trigger signal and producing an electromagnetic radiation signal representative of said trigger signal, said electromagnetic radiation signal having a selected encoded output waveform, receiving and decoding said selected encoded output waveform to reproduce said trigger signal, and activating the warning upon detection of the trigger signal.

13. A fish bite detector for use with a fishing rod and fishing line attached to the fishing rod, the fish bite detector comprising:

a tension sensor for mounting to the fishing rod, the tension sensor including an arm disposed through its entire length parallel to the longitudinal axis of the fishing rod, the arm having a projecting portion extending from said arm for engaging the fishing line to sense tension in the fishing line, the projecting portion of the arm including oppositely extending synclinal projections positioned between the fishing rod and the fishing line, the projections extending perpendicularly from a free end of the arm and disposed perpendicularly to the longitudinal axis of the fishing rod, each projection inclined toward the fishing rod for rapid attachment and detachment of the fishing line to said arm from both left-handed and right-handed positions, each projection inclined toward the fishing rod, such that the line of the fishing rod is displaced normally toward the fishing rod when engaged by one of said projections, and warning means associated with said tension sensor for producing a perceptible warning on detection of a change in tension in the fishing line that is characteristic of a fish bite.

14. The fish bite detector of claim 13 wherein:

said arm has a proximal end mounted in a fixed position relative to the fishing rod, and said tension sensor includes a sensing pole, said arm bearing on said sensing pole between said proximal end and said free end, and tension on a fishing line engaged by one of said synclinal projections urges said arm away from the fishing rod and exerts pressure against said sensing pole in proportional relation to said tension, said sensing pole for sensing said pressure to produce a continuous electronic output representative of said pressure to detect changes in the output representative of a change in tension in the fishing line that is characteristic of a fish bite.

15. The fish bite detector of claim 14 wherein:

said tension sensor includes a piezoelectric crystal, said piezoelectric crystal in contact with said sensing pole, said piezoelectric crystal for sensing said pressure on said sensing pole and for producing a continuous electronic output representative of said pressure to detect changes in the output representative of a change in tension in the fishing line that is characteristic of a fish bite.

16. A fish bite detector for use with a fishing rod and fishing line attached to the fishing rod, the fish bite detector comprising:

a tension sensor for mounting to the fishing rod and for engaging the fishing line to sense tension in the fishing line, said tension sensor producing a continuous sensor output related to the tension in the fishing line, a three stage filter circuit for receiving said sensor output and for effectively removing from said sensor output signal components generated by extraneous environmental elements, said filter circuit further for producing a detectable filter output in response to a tension variation in the line that substantially matches a predetermined tension variation characteristic of a fish bite on the line, and warning means associated with said tension sensor for producing a perceptible warning, said warning means activated by a detectable signal produced by said filter circuit.

17. The fish bite detector of claim 16 wherein:

said filter circuit comprises a bandpass filter.

18. The fish bite detector of claim 16 including:

a comparator for receiving said filter output of said filter circuit and for providing a predetermined reference which is compared to said filter output, said comparator generating a trigger signal when said filter output reaches a threshold defined by said predetermined reference, and said warning means being activated by the trigger signal.

19. The fish bite detector of claim 18 wherein:

the predetermined reference is adjustable.

20. The fish bite detector of claim 19 wherein:

the predetermined reference comprises a voltage.

21. The fish bite detector of claim 18 wherein said warning means includes a transmitter circuit for receiving said trigger signal and for generating an electromagnetic radiation signal representative of said trigger signal, and a receiver circuit for receiving said electromagnetic radiation signal and for regenerating said trigger signal.

22. The fish bite detector of claim 21 wherein said warning means includes an encoder for receiving said trigger signal and for producing a coded output, and a decoder for receiving said coded output and for decoding said coded output to reproduce said trigger signal.

23. The fish bite detector of claim 22 wherein:

said encoder has at least twelve binary switches, and said decoder has a corresponding number of binary switches.

24. The fish bite detector of claim 22 wherein said warning means includes a transmit gate and timer for receiving said trigger signal and for converting said trigger signal into a timed pulse.

25. The fish bite detector of claim 18 wherein said warning means includes a transmit gate and timer for receiving said trigger signal and for converting said trigger signal into a timed pulse.

26. The fish bite detector of claim 18 wherein said warning means includes a plurality of alarms, and a switch for selectively activating each one of said alarms.

27. The fish bite detector of claim 26 wherein said plurality of alarms includes an audible alarm and a vibratory alarm.

28. A fish bite detector for use with a fishing rod and fishing line attached to the fishing rod, the fish bite detector comprising:

a tension sensor for mounting on the fishing rod, said tension sensor including an arm disposed through its entire length parallel to the longitudinal axis of the fishing rod, and oppositely extending synclinal projections extending perpendicularly from a free end of the arm and disposed perpendicularly to the longitudinal axis of the fishing rod, each projection inclined toward the fishing rod for engaging the fishing line to sense tension in the fishing line, such that the fishing line is displaced toward the fishing rod when engaged by one of the projections, the tension sensor producing a continuous sensor output related to the tension in the fishing line, a filter circuit having three stages for receiving said sensor output and for effectively removing from the sensor output signal components generated by extraneous environmental elements and for producing a detectable filter output in response to any change in tension in the line that substantially matches a predetermined tension change characteristic of a fish bite on the line, and warning means for receiving said filter output and for producing a perceptible warning on detection of a change in tension in the fishing line that is characteristic of a fish bite.

29. The fish bite detector of claim 28 including a housing for demountably attaching said sensor and said arm to the fishing rod between the fishing rod and the fishing line, said housing having a base and an upright portion, said upright portion having a concave surface for mounting said housing to the fishing rod, and said sensor fixed to said base.

30. The fish bite detector of claim 29 wherein said housing floats.

31. The fish bite detector of claim 28 including:

a comparator for receiving the filter output of said filter circuit and for providing a predetermined variable reference which is compared to said filter output, said comparator generating a trigger signal when the filter output reaches a threshold defined by said predetermined reference, means for adjustment of said predetermined reference of said comparator, a transmit gate and timer for receiving said trigger signal and for converting said trigger signal into a timed pulse, an encoder for receiving said trigger signal and for producing a coded output, a transmitter circuit for receiving said coded output from said encoder and for generating an electromagnetic radiation signal representative of said coded output, a receiver circuit for receiving said electromagnetic radiation signal and for regenerating said coded output, a decoder for receiving said coded output and for decoding said coded output to reproduce said trigger signal, and warning means for detecting said trigger signal and generating a perceptible warning upon the detection of said trigger signal, said warning means having at least two alarms and a switch for selecting which of said alarms to activate.

32. The fish bite detector of claim 28 wherein:

said filter circuit comprises at least three stages.

33. A method for detecting a fish bite on a fishing line attached to a fishing rod comprising:

mounting to the fishing rod between the fishing rod and the fishing line an arm disposed through its entire length parallel to the longitudinal axis of the fishing rod axis for sensing tension in the fishing line, engaging the fishing line to a projecting portion extending from the arm, producing a continuous sensor output related to the tension in the fishing line, effectively filtering out from the sensor output components generated by extraneous environmental elements, producing a detectable filter output in response to any change in tension in the line that substantially matches a predetermined tension change characteristic of a fish bite on the line, and producing a perceptible warning upon detection of a filter output.

34. The method recited in claim 33 including receiving the filter output, comparing the filter output to a predetermined reference, generating a trigger signal when the filter output reaches a threshold defined by the predetermined reference, and activating the warning upon detection of the trigger signal.

35. The method recited in claim 33 wherein;

said filtering out function is performed with a bandpass filter having at least three stages.

* * * * *